June 24, 1952 P. E. ALLEN 2,601,488
AUTO BED
Filed Oct. 3, 1947 2 SHEETS—SHEET 2

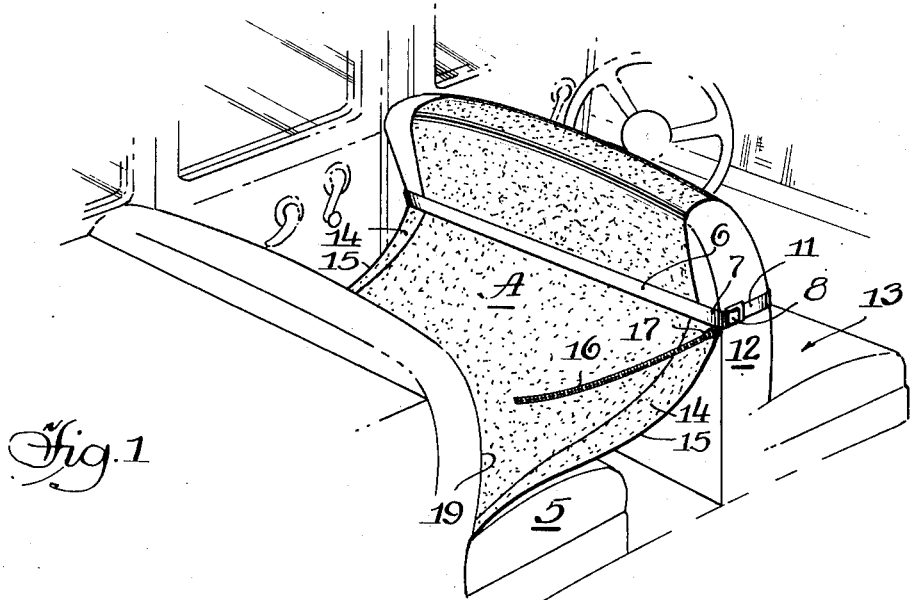
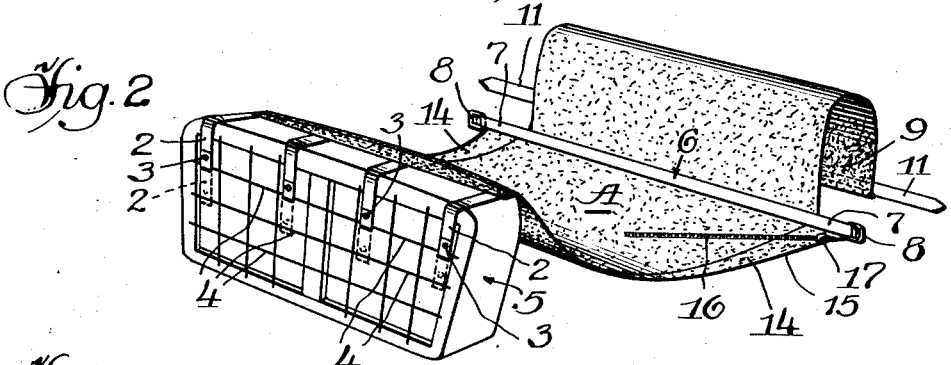
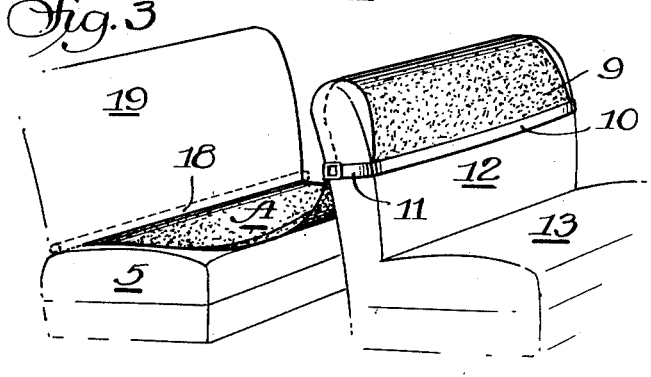

INVENTOR.
Paul E. Allen,
BY
Atty.

UNITED STATES PATENT OFFICE 2,601,488

AUTO BED

Paul E. Allen, Skokie, Ill.

Application October 3, 1947, Serial No. 777,792

3 Claims. (Cl. 5—94)

The present invention relates to an attachment for an automobile and more particularly to a novel device adapted to be mounted in the interior of an automobile to provide a bed which will readily accommodate a child or adult.

Among the objects of the present invention is the provision of a novel bed attachment for the interior of an automobile that may be quickly assembled or removed, and when assembled provides a comfortable bed for a child or other occupant. The bed is so designed that the occupant is substantially suspended between the seats.

A further object of the present invention is the provision of an automobile bed secured at its rear end to the back seat and at its forward end to the back rest or upright portion of the front seat whereby to provide a bed of maximum width spanning or bridging the space between the rear and front seats and the opposite interior sides of the body of an automobile, and which bed will readily accommodate a child or adult and provide a comfortable bed for either.

The present invention further comprehends a novel attachment and a novel means and manner of mounting said attachment in the interior of an automobile to provide a comfortable bed. The attachment is so adjustable that it may be mounted in all standard makes of automobiles of the type provided with front and rear seats disposed in spaced relation.

Although the present novel automobile bed is so constructed that it spans or substantially spans the space between the opposite sides of the automobile whereby to eliminate any danger of a child falling off the bed or falling between or becoming lodged between the bed and and sides of the car, the present invention comprehends provision for an occupant when the bed is assembled or in use to sit in the rear seat and suspend his or her legs. This is accomplished by providing a slit or opening in the bed and employing a slide fastener or other quick detachable means to normally close the opening. This slit is disposed at an acute angle and extends inwardly from an edge of the bed whereby when the slide fastener or other detachable means is opened, allows the flap to drop and thereat provide leg room for an occupant.

In view of the width of the space provided in the interior of the various makes of automobiles, the present bed will readily accommodate an adult. Furthermore, by mounting and suspending the bed in the manner disclosed, optimum riding comfort is provided for the occupant.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment it is to be understood that the same is susceptible of modification and change and comprehends other details, arrangements of parts, features and constructions without departing from the spirit of the invention.

In the drawings:

Figure 1 is a perspective view of the interior of an automobile and showing the novel bed in operative position.

Fig. 2 is a perspective view of the auto bed attached to the back seat but detached from the back of the front seat.

Fig. 3 is another perspective view of the auto bed mounted in operative position, the view being taken to more clearly show the manner of attaching the bed to the back of the front seat.

Figure 4:
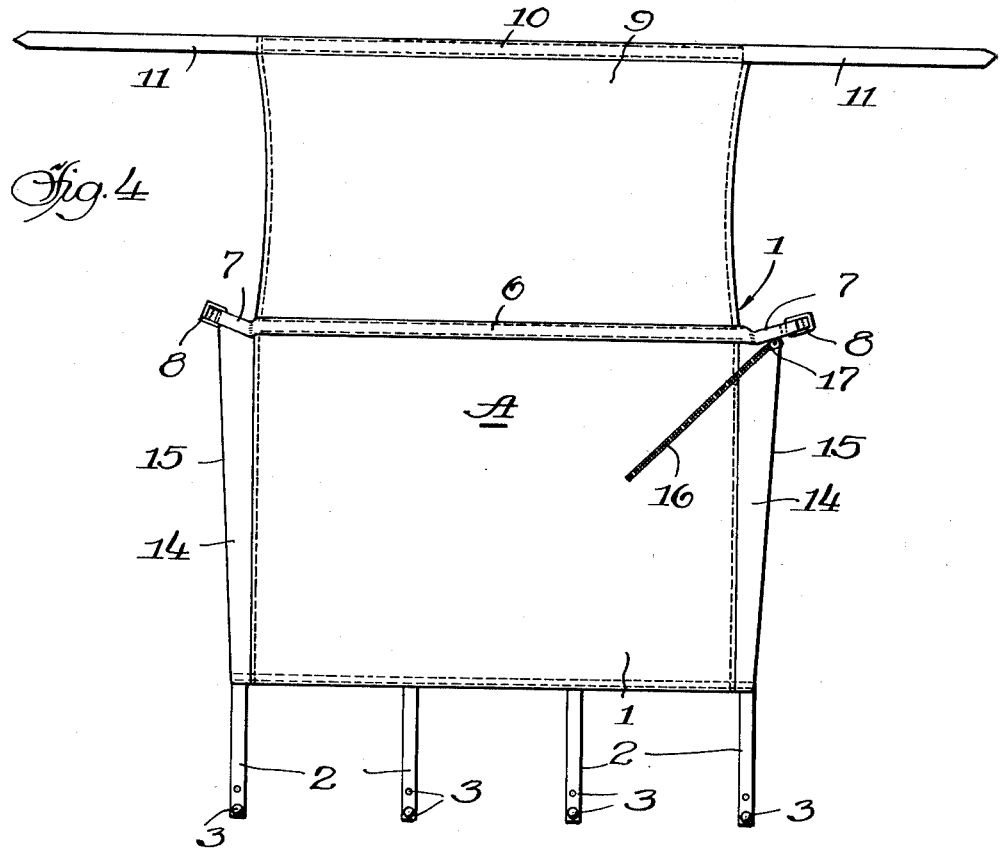
Fig. 4 is a plan view of the auto bed in extended and disassembled relation.
Figure 5:
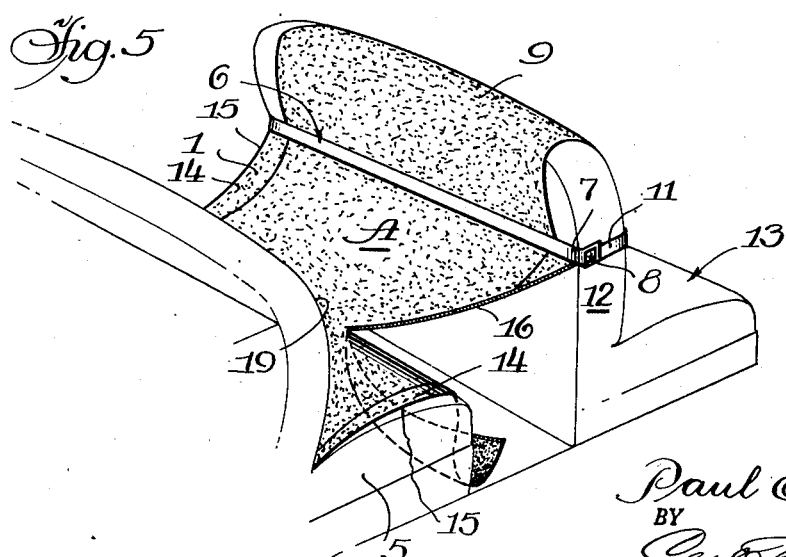
Fig. 5 is a perspective view of the bed similar to Fig. 1, but showing the slide fastener in open position whereby an occupant may be seated and suspend her or his legs, while at the same time a child may occupy the bed.

In the drawings is shown an illustrative embodiment of the present invention which comprises a bed formed of a sheet A of suitable fabric of such strength as to support thereon the weight of a child or other occupant. At the rear end of the section 1 of the sheet is provided a plurality of rearwardly extending tabs 2 each having suitable snap fasteners 3 at the ends of these tabs for attaching the latter to one of the longitudinally extending rods or spring supports 4 on the underside of the removable back seat cushion 5.

Intermediate the ends of the sheet or bed is provided a transverse strap or webbing 6 having laterally projecting tabs 7, 7. The free end of each tab 7 is provided with a buckle 8 or other suitable attaching means, and at the forward end of the section 9 of the sheet or bed is provided another strap or webbing 10 having laterally projecting free ends 11, 11, each adapted to be received by a buckle 8 when the forward section 9 of the bed is attached to the back or upright 12 of the front seat 13, in the manner shown.

In order that the bed completely spans or bridges the space between the opposite interior sides of the automobile body, the section 1 of the bed is provided with a pair of side extensions 14, 14 and the extreme or outer edges 15 thereof closely conform to the opposite interior sides of the automobile body. Extending from adjacent one of the tabs 7, the section 1 is split or opened for a substantial extent along a diagonal line at 16 and is thereat provided with a slide fastener 17. The purpose of this slide fastener is to permit an occupant to be seated upon the back seat and still have sufficient leg room to suspend his or her legs. The length of the split or opening is sufficient for this purpose, but at the same time the remainder of the bed is such as to permit a child or occupant to rest or sleep thereon without danger of such occupant rolling off of the bed.

The bed may be quickly assembled or disassembled in that all that is required in the assembly is to raise or remove the rear or back seat cushion 5 and attach the spaced tabs 2 over one of the horizontal rods or spring supports 4 in the manner shown in Fig. 2. The rear section 1 of the bed then extends over or across the upper surface of the rear seat cushion and the forward section is then placed over the upper portion of the back rest 12 of the front seat 13. Next the ends 11, 11 are inserted into their respective buckles 9, 8 and the ends drawn taut so as to anchor the forward end of the bed. When this is accomplished, the bed is assembled as shown in Figs. 1 and 3 in proper position to receive an occupant, with the section supporting surface 1 extending completely across the space from the rear edge of the back seat cushion to the back of the front seat, and with the opposite edges 15, 15 closely conforming to the interior of the opposite sides of the automobile. The operation is reversed if the bed is to be completely removed. However, if the rear seat is not needed, the bed may remain in its operative position as it in no way effects the occupants of the front seat and, in fact, may be employed as a protective covering for luggage or articles that may be placed therebeneath or on the floor of the car between the front and rear seats.

Due to the compact nature of this bed attachment when not in use, it may be detached merely from the back 12 of the front seat 13 and rolled or wound up into a compact roll that may be disposed in the space 18 between the back 19 and the rear seat cushion 5 where it is out of the way, until such time that the bed is again assembled for occupancy.

Although the fastening means at the opposite ends of the bed are generally sufficient to hold the assembled bed extended, if desired additional fastening means may be provided laterally of the bed. For example, fastening means may be provided on the edges 15 of the side pieces 14.

By providing the straps or webbing 6 and 10 in such manner that they encompass or extend completely about the back or upright portion 12 of the front seat and at a point intermediate the upper and lower ends thereof, the bed will support any occupant or occupants without danger of becoming detached from the front seat. As the present novel form of bed requires no fixtures such as clips, brackets, hooks or other attaching means affixed to the interior of an automobile, there is nothing to mar the interior finish thereof.

From the above description and the disclosure in the drawings, it will be apparent that the invention comprehends a novel auto bed of widespread application and use and which provides a very comfortable bed either while the automobile is travelling or at rest. Due to the adjustment provided in attaching the rear of the bed to any one of a plurality of spaced rods or spring supports extending longitudinally of the rear seat but transverse of the body of the automobile, the bed may be employed in various makes of automobiles even though there is an appreciable difference in the spacing of the seats.

Having thus disclosed my invention, I claim:

1. An auto bed comprising a fabric supporting surface adapted to extend from the rear of the rear seat to the front seat and across the space between the opposite sides of the interior of the automobile to provide a comfortable bed for a child or other occupant, means at the opposite ends of the supporting surface for securely anchoring said ends to support the weight of an occupant, the supporting surface at one side thereof being slit to provide an opening, and a slide fastener normally closing said opening but which when the slide fastener is opened provides space for an occupant to be seated in the rear seat and affords such occupant leg room without removal of the bed.

2. In combination with the front seat and the rear seat cushion of an automobile, an auto bed formed of a fabric material of such strength as to support a child or other occupant while the automobile is in motion or at rest, fastening means at the rear end of said material for anchoring said end to the underside of the rear seat cushion of the automobile with the said material extending forwardly over the rear seat cushion and to and over the back of the front seat, fastening means on the forward end of the bed adapted to extend about the opposite ends of the upright portion of the front seat to securely retain the forward end of the bed in assembled relation, said material being slit at one side thereof to form an opening providing space for an occupant to be seated in the rear seat without removal of the bed, and means for closing said opening to provide a continuous bed.

3. An auto bed comprising a fabric supporting surface adapted to extend from the rear of the rear seat to the front seat and across the space between the opposite sides of the interior of the automobile to provide a comfortable bed for a child or other occupant, means at the opposite ends of the supporting surface for securely anchoring said ends to support the weight of an occupant, the supporting surface at one side thereof being slit to provide an opening providing space for an occupant to be seated in the rear seat, and means for closing the opening to provide a continuous bed.

PAUL E. ALLEN.

REFERENCES CITED

The following references are of record in the file of this patent:

UNITED STATES PATENTS

| Number | Name | Date |
|---|---|---|
| 324,839 | Hazen | Aug. 25, 1885 |
| 1,959,974 | Westgate | May 22, 1934 |
| 2,348,217 | Jones | May 19, 1944 |
| 2,357,729 | DeFries | Sept. 5, 1944 |
| 2,564,480 | Jones | Aug. 14, 1951 |

OTHER REFERENCES

Popular Mechanics, article by H. R. Willis, p. 174, Jan. 1949.